US009285482B2

United States Patent
Vourc'h et al.

(10) Patent No.: US 9,285,482 B2
(45) Date of Patent: Mar. 15, 2016

(54) METHOD AND DEVICE FOR DETECTING AND EXCLUDING SATELLITE MALFUNCTIONS IN A HYBRID INS/GNSS SYSTEM

(75) Inventors: Sébastien Vourc'h, Paris (FR); Victor Mauger, Paris (FR)

(73) Assignee: SAGEM DEFENSE SECURITE, Paris (FR)

( * ) Notice: Subject to any disclaimer, the term of this patent is extended or adjusted under 35 U.S.C. 154(b) by 1043 days.

(21) Appl. No.: 13/257,939

(22) PCT Filed: Mar. 24, 2010

(86) PCT No.: PCT/EP2010/053807
§ 371 (c)(1),
(2), (4) Date: Sep. 20, 2011

(87) PCT Pub. No.: WO2010/108938
PCT Pub. Date: Sep. 30, 2010

(65) Prior Publication Data
US 2012/0013505 A1  Jan. 19, 2012

(30) Foreign Application Priority Data
Mar. 24, 2009  (FR) ...................................... 09 51894

(51) Int. Cl.
*G01S 19/20* (2010.01)
*G01S 19/47* (2010.01)

(52) U.S. Cl.
CPC *G01S 19/47* (2013.01); *G01S 19/20* (2013.01)

(58) Field of Classification Search
CPC ...................................................... G01S 19/20
See application file for complete search history.

(56) References Cited

U.S. PATENT DOCUMENTS 6,650,282 B2 * 11/2003 Martikka ................. 342/357.23
7,219,013 B1 * 5/2007 Young et al. ................... 701/472
(Continued)

FOREIGN PATENT DOCUMENTS

EP  1752786 A1 * 2/2007 ............... G01S 1/00
EP  1 956 386 A1  8/2008

OTHER PUBLICATIONS

Fuzzy Logic, Soft Computing and Computational Intelligence: Eleventh International Fuzzy Systems Association World Congress, Jul. 28-31, 2005, Beijing, China, vol. 1 Retrieved from the Internet:< URL:  http://books.google.com/books?id=gtToLI8h7S8C &printsec=frontcover&source=gbs_ge_summary_r &cad=0#v=onepage&q&f=false> on Jul. 9, 2014.*
(Continued)

*Primary Examiner* — Gregory C Issing
(74) *Attorney, Agent, or Firm* — Blakely Sokoloff Taylor & Zafman LLP

(57) ABSTRACT

A method for monitoring the integrity of position information outputted by a hybridization device that includes a bank (3) of Kalman filters, each filter developing a hybrid navigation solution from inertial measurements calculated by a virtual platform (2) and from raw measurements of signals transmitted by a satellite constellation which are outputted by a global navigation satellite system (GNSS). The method includes, for each satellite of the constellation of calculating a cross-innovation of the satellite that reflects the deviation between an observation, corresponding to a raw measurement from the satellite, and an a posteriori estimation of said observation that is developed through a Kalman filter and does not use the raw measurement from the satellite; carrying out a statistical test of the cross-innovation to ascertain whether or not the satellite is malfunctioning.

11 Claims, 2 Drawing Sheets

(56) References Cited

U.S. PATENT DOCUMENTS

| | | | |
|---|---|---|---|
| 7,711,482 B2* | 5/2010 | Coatantiec et al. | 701/476 |
| 2007/0096978 A1* | 5/2007 | van Diggelen et al. | 342/357.02 |
| 2007/0194984 A1* | 8/2007 | Waid | 342/357.02 |

OTHER PUBLICATIONS

Lee, Young et al. "A Performance Analysis of a Tightly Coupled GPS/Inertial System for Two Integrity Monitoring Methods," ION GPS 12th International Technical Meeting of the Satellite Division of ION. Sep. 1999, pp. 1-14.*

Bhatti, Umar. "Improved Integrity Algorithms for Integrated GPS/INS Systems in the Presence of Slowly Growing Errors." Thesis, Mar. 2007. pp. 1-359.*

Dr. John Diesel et al., GPS/IRS AIME: Calculation or Thresholds and Protection Radius Using Chl-Square Methods, Proceedings or the Institute or Navigation GPS, Sep. 1, 1995, pp. 1959-1964.

Benjamin J. Clark et al., GPS/INS Integration with Fault Detection and Exclusion in Shadowed Environments, Position, Location, and Navigation Symposium, 2008 IEEE/ION, May 5, 2008, pp. 1-8, Piscataway, NJ, USA.

Bradford W. Parkinson et al., Autonomous GPS Integrity Monitoring Using the Pseudorange Residual, Navigation: Journal of the Institute of Navigation, Jun. 1, 1998, pp. 255-274, vol. 35, No. 2, Fairfax, VA, USA.

\* cited by examiner

METHOD AND DEVICE FOR DETECTING AND EXCLUDING SATELLITE MALFUNCTIONS IN A HYBRID INS/GNSS SYSTEM

This is a non-provisional application claiming the benefit of International Application Number PCT/EP2010/053807 filed Mar. 24, 2010.

BACKGROUND OF THE INVENTION

1. Field of the Invention

The field of the invention is that of carriers using information provided both by an inertial unit and by a satellite navigation system, as for example a GPS system.

The invention relates to a data fusion device and method and applies more particularly to the detection and rejection of satellite failures.

2. Description of Related Art

Carriers such as aircraft or even boats have many navigation systems available. Among these systems is included hybrid INS/GNSS (Inertial Navigation System/Global Navigation Satellite System) equipment.

An inertial unit provides low-noise information that is accurate in the short term. However, in the long term, the localization performance of an inertial unit decays (more or less quickly depending on the quality of the sensors, accelerometer or gyroscopes for example, and of the processing employed by the unit). While for its part the information acquired from a satellite navigation system is very unlikely to drift in the long term, it is however often noisy and of inconsistent accuracy. Furthermore, inertial measurements are always available while GNSS information are not or are liable to be decoyed or scrambled.

Data fusion consists of combining the information supplied by the inertial unit and the measurements provided by the satellite navigation system to obtain position and speed information by taking advantage of both systems. Thus, the accuracy of the measurements provided by the GNSS receiver allows the inertial drift to be controlled and the low-noise inertial measurements make it possible to filter the noise in the GNSS receiver measurements.

Modern navigation systems calculate protective radii about the calculated position which allow the true position error to be held to a given integrity risk, which is what defines the integrity of a system.

According to the state of the art, these protective radii can be calculated by means of a bank of Kalman filters which makes it possible to have protection from a possible satellite failure.

These filters implement the fusion of the information coming from the satellite navigation system and that coming from the inertial unit. One of the filters in the bank, designated with the term principal filter, uses all the GNSS measurements consisting of pseudo-measurements and information on their quality. The other filters, called secondary, of the filter bank use only a part of the available GNSS measurements. If a breakdown occurs in a satellite measurement, this will not be seen by the secondary filter which does not receive this measurement: this secondary filter will therefore remain uncontaminated.

The use of such a bank of Kalman filters within the scope of a closed loop data fusion (that is when it is desired to apply the corrections calculated by the Kalman filter directly to the virtual platform) has for example been proposed by document EP1801539 A1.

This document contemplates advantageously integrating only one virtual platform and to implement satellite failure detection in order to select the Kalman filter the output whereof will be applied to the virtual platform and to the inertial measurements issuing from it in order to correct them.

Thus, this document contemplates selecting the main Kalman filter when no failure of one of the satellites is detected or, when a failure is detected, to select the secondary Kalman filter not affected by the failure.

Inasmuch as the corrections thus come from a single filter and as this filter is not affected by a satellite failure, erroneous corrections are not applied to the inertial measurements through propagation of information corrupted by a satellite failure.

However, the architecture proposed in this document has not proven completely satisfactory. Indeed, inasmuch as corrections are derived from a single filter, if a failure is not detected or if the wrong satellite is rejected, the virtual platform will be compensated with a command issued by a filter contaminated by that failure. Inasmuch as this document also provides for the calculation of a priori estimated pseudo-measurements being carried out based on information delivered by the virtual platform, the pseudo-measurements used by all the filters are then contaminated.

Thus, when a failure appears in one pseudo measurement and as long as the failure detection and rejection method has not identified the faulty satellite, the filter which does not use the pseudo-measurement where the failure is actually present is contaminated.

Moreover, this architecture proposes to carry out a copying operation onto all the other filters of the system, rejecting the satellite identified as having failed by the detection and rejection method. This copying operation is problematical in the case where the satellite identified as having failed is in reality healthy because the filter which is genuinely healthy is replaced with a contaminated filter. This method can lead to a loss of integrity inasmuch as the position error committed at the output of the hybrid system may no longer be protected by the protective radius calculated by the system.

The use of a bank of Kalman filters was also proposed in document U.S. Pat. No. 7,219,013. According to this document, the protective radii are calculated using the separation solution method while the detection and rejection of a satellite breakdown implement monitoring of the innovation residuals of the Kalman filters.

But in this architecture, too, and for reasons similar to those stated earlier in connection with document EP1801539 A1, the integrity of the filter which rejects the failure is not guaranteed.

Furthermore, this architecture does not allow isolation of the breakdowns induced by slight drifts, so that it proves necessary to complete the monitoring of the innovation residuals with a so-called least squares method using only GNSS information.

BRIEF SUMMARY OF THE INVENTION

The object of the invention is to correct these deficiencies, and to this end offers, according to a first aspect, a process for monitoring the integrity of position information delivered by a data fusion device including a bank of Kalman filters each preparing a hybrid navigation solution based on inertial measurements calculated by a virtual platform and raw measurements of signals emitted by a constellation of satellites delivered by a GNSS satellite positioning system, characterized in that it comprises the steps consisting, for each satellite in the constellation, of:

calculating a cross-innovation of the satellite reflecting the disparity between an observation corresponding to a raw measurement issuing from the satellite and an a posteriori estimate of said observation generated by a Kalman filter not using the raw measurement issuing from the satellite, carrying out a statistical test of the cross-innovation to declare whether or not the satellite is faulty.

Certain preferred but non-limiting aspects of this process are the following:

the statistical test declares a satellite as faulty when its cross-innovation exceeds a threshold;

the threshold corresponds to $(H \cdot P_i \cdot H^T + R_i) * \alpha$, where H represents the observation matrix of the Kalman filter, $P_i$ the a posteriori error covariance estimation matrix, $R_i$ the covariance matrix of the measurement noise, and $\alpha$ a coefficient the value whereof is set according to the probability of a false detection;

the cross-innovation of a satellite corresponds to the disparity between the pseudo-distance to said satellite delivered by the satellite positioning system and an a posteriori estimate of that pseudo-distance provided by a Kalman filter not using the pseudo-distance provided by the satellite;

the process also comprises the steps consisting of invalidating a satellite declared as faulty so that the raw measurements of said faulty satellite are no longer used by the filters in the bank, rejecting the invalidated satellite if at the expiration of a predetermined period following the invalidation the statistical test of the cross-innovation still concludes that said satellite is faulty and no other cross-innovation test has declared the failure of another satellite;

in the event of a declaration of failure of a new faulty satellite during the predetermined period, the formerly invalidated satellite is validated so that its raw data are once again used by the filters in the bank, and the new faulty satellite is invalidated;

in the event of a declaration of failure of a satellite, a partial reinitialization of the filters in the bank is carried out using the satellite declared to be faulty by reinitializing the states linked to the measurements received from the satellite positioning system and the states linked to the other sensors employed, and by desensitizing the states affected by the breakdown by adding state noise;

the process also implements, for each filter in the bank, a statistical test of the a priori innovation of each satellite used by the filter;

in the case where several satellites are declared to be faulty as a result of the statistical test of their cross-innovation, the satellite not used by the filter having the greatest number of a priori innovations the statistical test whereof is below the threshold is invalidated, so that the raw measurement of said invalidated satellite is no longer used by the filters of the bank; and in the case where several satellites are declared to be faulty as a result of the statistical test of their cross-innovations and several filters have the same number of a priori innovations the statistical test whereof is below a threshold, the satellite whereof the absolute value of the ratio of the cross-innovation to its covariance (also called the normalized cross-innovation) is the greatest is invalidated.

According to a second aspect, the invention relates to a data fusion device comprising a bank of Kalman filters each generating a hybrid navigation solution based on inertial measurements calculated by a virtual platform and raw measurements of signals emitted by a constellation of satellites delivered by a satellite positioning system, characterized in that it comprises a satellite failure detection and rejection module configured so as to implement the process according to the first aspect of the invention.

BRIEF DESCRIPTION OF THE DRAWINGS

Other aspects, objects and advantages of the present invention will be more apparent upon reading the following detailed description of the preferred embodiments thereof, given by way of a non-limiting example and made with reference to the appended FIG. 1, which is a schematic diagram illustrating one possible embodiment of a device according to the invention.

DETAILED DESCRIPTION OF THE INVENTION

Figure 1:
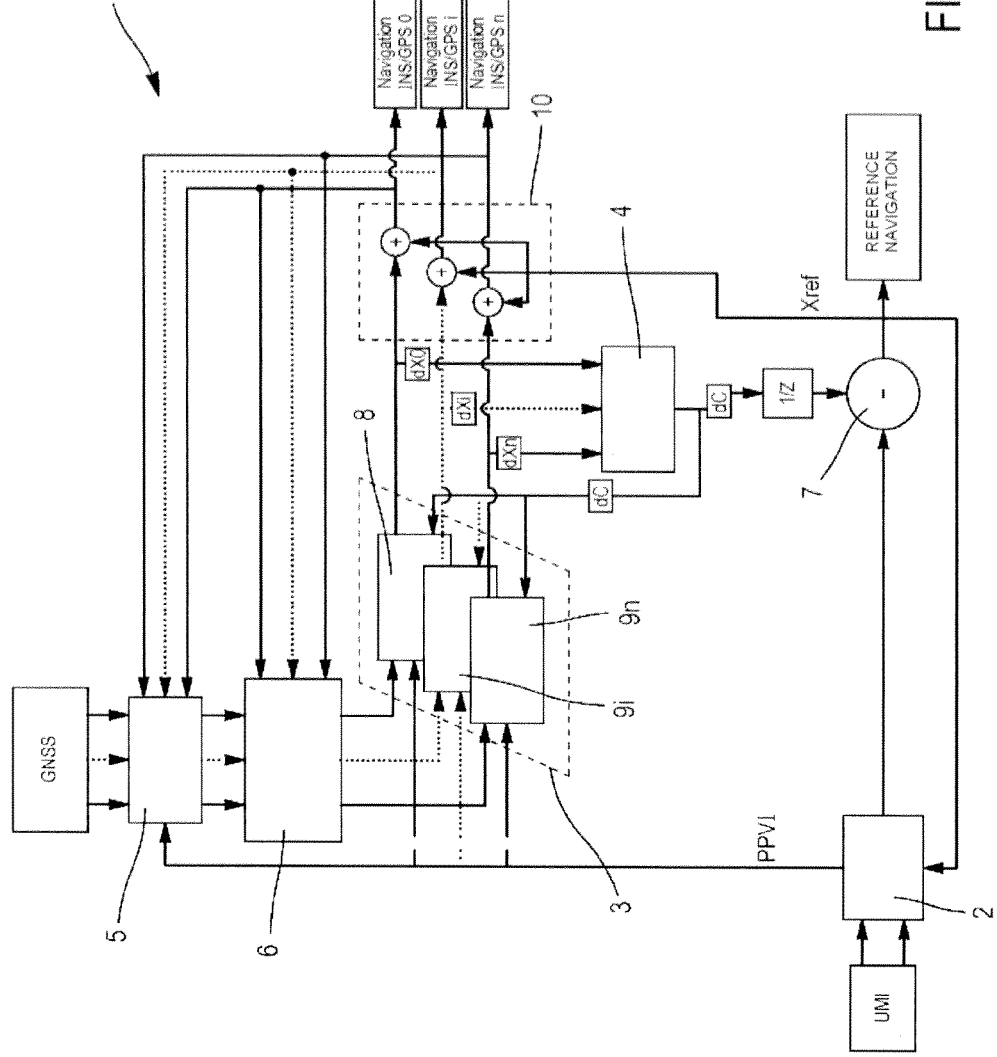

With reference to FIG. 1, a data fusion device 1 is shown which conforms to one possible embodiment of the second aspect of the invention, designed to be carried within a carrier such as an aircraft. The data fusion device 1 uses information provided by an inertial unit UMI and by a satellite navigation system GNSS, and comprises a single virtual platform 2 and a bank 3 of Kalman filters.

The virtual platform 2 receives inertial increments coming from the sensors (gyroscopes, accelerometers) of the inertial unit. The inertial increments correspond in particular to angular increments and to increments of speed. Inertial navigation information (such as the attitudes, the heading, the speed or the position of the carrier) are calculated by the virtual platform 2 based on these increments. This inertial navigation information is called inertial measurements PPVI from now on.

These inertial measurements PPVI are transmitted to an estimated pseudo-distance calculation device (not shown in FIG. 1) which also receives data on the position the satellites. Based on inertial measurements on the one hand and satellite position data on the other, the a priori estimated pseudo-distance calculation device calculates the a priori pseudo-distances between the carrier and the different satellites visible from the carrier.

The fusion device 1 also receives from the GNSS satellite navigation system the pseudo-measurements between the carrier and the different visible satellites. The disparities (called observations) between the pseudo-measurements estimated a priori and the pseudo-measurements delivered by the GNSS system are then calculated conventionally.

The fusion device 1 also includes a bank of Kalman filters 3 carrying out the fusion of the inertial information coming from the inertial unit and the information from the satellite navigation system. Aside from a function of providing statistical information in the output measurements, the role of the filters is to keep the virtual platform 2 within a linear operating region that is the image of that modeled in the Kalman filter by each estimating a state vector dX0–dXn (comprising as a general rule on the order of 30 components).

In a conventionally known manner per se, the filter bank 3 comprises several Kalman filters in parallel. One of the filters is called the main Kalman filter 8: it takes into account all the observations (and receives for this purpose all the measurements coming from the GNSS system) and generates a principal hybrid navigation solution.

The other filters $9i$, $9n$ are called secondary filters: they take into account only a part of the observations, for example (n−1) observations of the n observations relating to the n visible satellites so that the i-th secondary Kalman filter $9i$ receives from the GNSS system the measurements of all the satellites except the i-th one, and each generates a secondary hybrid navigation solution.

It will be deduced that the observation generating process described above is not common to all the filters of the bank 3, but is carried out for each of the filters. Thus, the calculation of the a priori pseudo-distances and the calculation of observations which are mentioned above are not common to all the filters of the bank, but rather the data fusion device 1 of the invention carries out these calculations for each filter of the bank.

The fusion device 1 generates a hybrid output Xref ("reference navigation") corresponding to the inertial measurements PPVI calculated by the virtual platform 2 and corrected, via a subtractor 7, by a stabilization vector dC having as many components as state vectors estimated by the Kalman filters.

In order to generate hybrid navigation solutions, the device 1 includes a bank of summers 10, where each summer is positioned at the output of a filter in the bank to add to a state vector dX0–dXn generated by the filter the hybrid output Xref.

Within the scope of a closed loop fusion device, the hybrid output Xref is looped back to the input of the virtual platform 2.

Further, as shown in FIG. 1, the stabilization vector dC can be applied to the input of all the filters of the filter bank. In this manner, the Kalman filters adjust by subtracting from their estimation (state vector dX) the correction dC and are thus kept consistent with the virtual platform.

The fusion device also includes a module 4 for generating the stabilization vector dC, two embodiments whereof are given hereafter by way of non-limiting examples.

According to a first possible embodiment, the corrections to be applied to the inertial measurements come from a single filter. Thus the stabilization vector dC is equal, in all components, to the state vector estimated by the selected Kalman filter. The selection is carried out for example within the module 4 in conformity with document EP1801539 A by detection of a possible satellite failure.

According to a second possible embodiment, the stabilization vector dC is generated component by component, using all the Kalman filters for each component. The module 4 for generating the correction dC is then configured to generate each of the components dC[state] of the stabilization vector dC as a function of all the corresponding components dX0[state]–dXn[state]. The generation of each component is carried out for example in conformity with patent application FR0858721 filed on 17 Dec. 2008 by the Applicant.

According to a variation in implementation of the invention shown in FIG. 1, each filter of the bank is associated with a satellite measurement correction module 5 delivering to the filter the measurements (typically pseudo-measurements) of the GNSS satellite positioning system which are used by the filter after correction by means of the hybrid navigation solution generated by the filter. This correction module 5 is the subject of patent application FR 0358726 filed on 17 Dec. 2008 by the Applicant.

In what follows, a failed satellite is defined as being a satellite which sends erroneous information in its message, leading to a discrepancy (fixed or variable) between its real position and the position given in its message.

Figure 2:
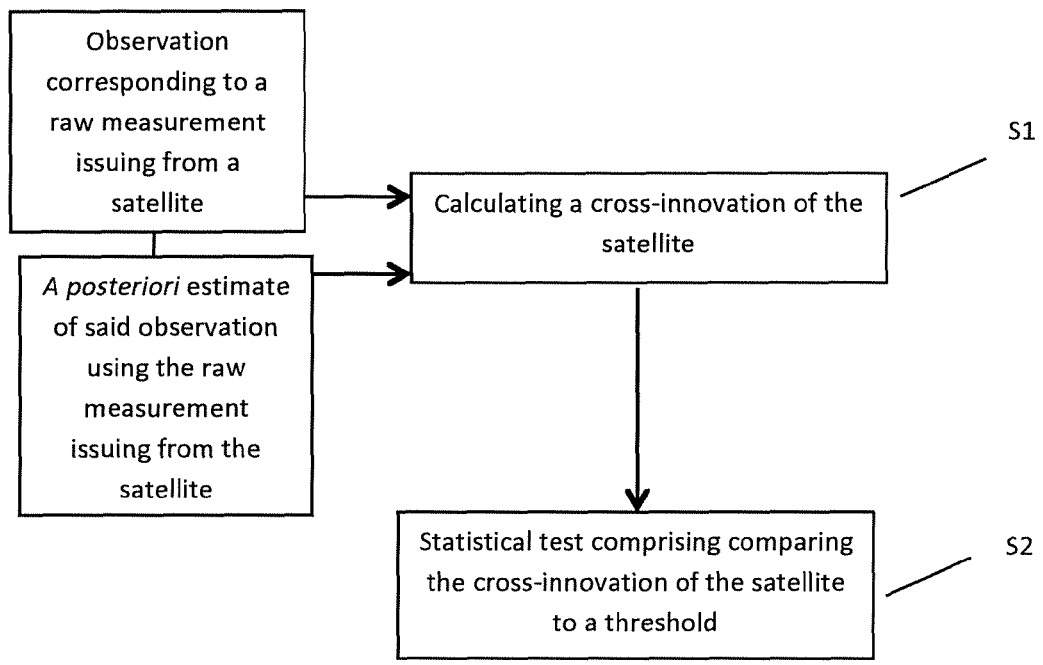
FIG. 2 is a schematic diagram illustrating the steps of carrying out a statistical test of the cross-innovation to declare whether or not the satellite is faulty according to the invention.

The data fusion device according to the invention includes a module 6 for detecting and rejecting satellite failures configured to as to implement, for each satellite of the constellation, the steps, as shown in FIG. 2, consisting of:

S1, calculating a cross-innovation of the satellite reflecting the disparity between an observation corresponding to a raw measurement issuing from the satellite and an a posteriori estimate of said observation generated by a Kalman filter not using the raw measurement issuing from the satellite, so that this estimate is independent of the satellite that it is desired to test; and S2, carrying out a statistical test of the cross-innovation to declare whether or not the satellite is faulty.

As will be detailed later, the module 6 for detecting and rejecting satellite failures also implements a GNSS measurement management and rejection function to monitor the innovations in the event of detection of a faulty satellite. In the embodiment shown in FIG. 1, the module 6 thus receives GNSS measurements, after correction by the module 5 if applicable, and routes this information to the different filters of the bank according to the circumstances (no satellite detected as being faulty; invalidation of a satellite detected as being faulty; rejection of a satellite detected as being faulty).

Thus the invention proposes to carry out satellite failure detection and rejection based on the cross-innovation tests of the unused satellites and the innovation tests of the satellites in use at the time of the fusion by each filter of the filter bank.

Within the scope of the invention, each filter not using a satellite tests the innovation of that satellite (called cross-innovation) based on the position provided by that filter. A satellite failure can thus be detected by the filter not using the failed satellite. The advantage compared with conventional innovation tests is that the filter that makes it possible to test a failed satellite is not perturbed by the failure.

Indeed, the i-th secondary Kalman filter $9i$ receives from the GNSS system (via, if applicable, the correction module 5) the measurements of all the satellites except the i-th one, and thus generates the state vector dXi independently of satellite i, so that the filter $9i$ is not perturbed by a possible failure affecting satellite 1.

The cross-innovation of a satellite corresponds for example to the disparity between the pseudo-distance to said satellite $PR_i$ delivered by the satellite positioning system, and an a posteriori estimate $\hat{PR}_i$ of that pseudo-distance supplied by a Kalman filter not using the pseudo-distance delivered by the satellite, so that this estimation $\hat{PR}_i$ is independent of the satellite that it is desired to test. The result of the test will thus not be perturbed by a failure, and in particular by a slow failure, of the satellite.

It is stated here that the cross-innovation can generally be applied to an raw measurement, for example to a measurement of pseudo-speed (also called a Doppler measurement).

Returning to the example of a cross-innovation applied to a pseudo-distance, the cross-innovation of the satellite with the index i is denoted $\text{Inno}_i$:

$\text{Inno}_i = PR_i - \hat{PR}_i = H(X_i) - H(\hat{X}_i)$, where

H corresponds to the observation model of the Kalman filter,

Xi corresponds to the unknown true position of the carrier $\hat{X}_i$ corresponds to the position of the carrier as estimated by the i-th secondary Kalman filter $9i$, hence $\hat{X}_i$+Xref.

By linearizing the foregoing equation by development of the observation matrix H to the first order: $\text{Inno}_i = \dot{H}(\hat{X}_i) \cdot (X_i - \hat{X}_i)$ where designates the first: order derivative of H.

The error statistics $(X_i - \hat{X}_i)$ on the position being known through the Kalman filter (it is denoted Pi in what follows), the statistical test consists for example of comparing the cross-innovation with a threshold depending on its covariance and taken to be equal to $(H \cdot P_i \cdot H^T + R_i) * \alpha$, where H represents the observation matrix of the Kalman filter, $P_i$ the a posteriori estimation matrix of the covariance of the error, $R_i$ the covariance matrix of the measurement noise, and $\alpha$ a coefficient the value whereof is set according to the probability of a false detection.

A satellite is then declared as faulty when its cross-innovation exceeds the threshold presented above. In order to carry out the rejection function, the module 6 is also configured to:

- invalidate a satellite declared to be faulty so that the raw measurements of said faulty satellite are no longer used by the filters in the bank,
- reject the invalidated satellite if on expiration of a predetermined period TE following the invalidation the statistical test of the cross-innovation of said satellite still concludes that said satellite is faulty, and no other cross-innovation test has reported the failure of another satellite.

Thus, when a satellite is detected as having a breakdown, the satellite continues to be monitored for a time TE. This satellite, with the index i for example, will no longer be used by all the filters but will continue to be tested by the filter 9i which does not fuse it, via the cross-innovation test (the fact of invalidating the suspect satellite actually changes nothing in the operation of the filter 9i which does not use that satellite). The advantage of invalidating the suspect satellite during the rejection process is that if there is no ambiguity in the selection of the satellite to be rejected, it will in fact be rejected from the beginning of the period TE (at the time of detection). Thus, the value of the duration TE does not in the majority of cases influence the performance of the data fusion device.

According to a possible embodiment, in the event of detection of failure of a new satellite during the period TE, the formerly invalidated satellite is validated so that these raw data will again be used by the filters in the bank, and the new faulty satellite is invalidated. A change of suspect satellite is thus carried out when, despite the invalidation of the first satellite, another cross-innovation exceeds the threshold (which is not supposed to occur under the assumption that the first satellite was really the one that was faulty).

According to another possible embodiment, for each filter in the bank, a statistical test of a priori innovation of each of the satellites used by the filter is also performed. The aim is for example to carry out a gaussian test of the innovations (constrained by a probability β) for the satellites used by each filter.

These so-called conventional tests of innovations can help to select the filter not using the faulty satellite when several cross-innovations exceed a threshold. Indeed, it can happen that a failure of a satellite perturbs the position of one or more filters using it enough for their cross-innovations to also exceed this threshold. It is then necessary to invalidate the right satellite among several possible ones. In this embodiment, the selection of the satellite to be invalidated is facilitated by taking into account the conventional innovation tests which make it possible to evaluate the relevance of each of the filters. The most reliable filter will be that having the greatest number of conventional innovations below the threshold.

Thus, in the case where several satellites are declared to be faulty as a result of the statistical test of their cross-innovation, the satellite that is invalidated is that not used by the filter having the greatest number of a priori innovations, the statistical test whereof is below the threshold, so that the raw measurement of the invalidated satellite is not used by the filters in the bank.

It can also happen that several satellites are declared to be faulty as a result of the statistical test of their cross-innovations and that there exist several filters not using these satellites having the same greater number of a priori innovations the statistical test whereof is below a threshold. In this case, the selection of the faulty satellite to be invalidated is then made considering the satellite giving the normalized cross-innovation with the highest absolute value.

According to another aspect of the invention, in the event of declaration of failure of a satellite, a partial reinitialization of the filters of the bank can be carried out using the rejected satellite, particularly by reinitializing the states connected with the other sensors used (such as the barometer), and by desensitizing the states affected by the failure by adding state noise, this in order to make the filters involved re-converge toward a sound solution if the satellite detected as faulty is actually the satellite having a breakdown.

It will be noted that this type of reinitialization can be carried out upon the declaration of failure of a satellite, or upon a change of identification of the faulty satellite during the period TE.

The advantages of the process and of the device according to the invention are particularly the following:

- the filter in the bank not using the sick satellite is no longer affected by the breakdown;
- the filters in the bank are totally segregated;
- integrity is always guaranteed without means of detecting and rejecting failure, internal or external;
- integrity is no longer constrained by a failure detection and rejection means;
- the computing burden of the satellite failure detection and rejection process is low;
- the requirements of continuity constrain only the detection and exclusion algorithm;
- the detection of slow failures is carried out with the same performance as fast failures (same mean values of the systematic errors detected).

The invention claimed is:

1. A process for monitoring the integrity of position information delivered by a data fusion device comprising a bank (3) of Kalman filters including:
   - a main Kalman filter generating a principal hybrid navigation solution based on inertial measurements calculated by a virtual platform (2) and raw measurements of signals emitted by all the satellites of a satellite positioning system (GNSS),
   - for each satellite, a secondary Kalman filter generating a secondary hybrid navigation solution based on inertial measurements calculated by a virtual platform (2) and raw measurements of signals emitted by all the satellites of the satellite positioning system except for said satellite,
   - the method comprising for each satellite in the constellation:
     - calculating (S1) a cross-innovation of the satellite which is representative of the distance between:
       - an observation corresponding to a raw measurement issuing from said satellite, and
       - an a posteriori estimate of said observation generated by a Kalman generating a secondary hybrid navigation solution based on inertial measurements calculated by a virtual platform (2) and raw measurements of signals emitted by all the satellites of the satellite positioning system except for said satellite;

performing (S2) a statistical test comprising comparing the cross-innovation of said satellite to a threshold and declaring a satellite to be faulty when its cross-innovation exceeds a threshold.

2. The process according to claim 1, wherein the threshold corresponds to $(H \cdot P_i \cdot H^T + R_i)*\alpha$, where H represents the observation matrix of the Kalman filter, $P_i$ the a posteriori estimation matrix of the covariance of the error, $R_i$ the covariance matrix of the measurement noise, and a $\alpha$ coefficient reflecting a probability of a false detection of a satellite failure.

3. The process according to claim 1, wherein the cross-innovation of a satellite corresponds to the difference between a pseudo-distance to said satellite delivered by the satellite positioning system and an a posteriori estimate of that pseudo-distance supplied by the secondary Kalman filter based on the observations of all the satellites of the satellite positioning system except for said satellite.

4. The process according to claim 1, also comprising:
invalidating a satellite declared to be faulty so that the raw measurements from said faulty satellite are no longer used by the filters in the bank,
rejecting the invalidated satellite if, on expiration of a predetermined period following invalidation, the statistical test of the cross-innovation still concludes that said satellite is faulty and no other cross-innovation test has declared the failure of another satellite.

5. The process according to claim 4 wherein, in the event of declaration of failure of another satellite during the predetermined period, the formerly invalidated satellite is validated so that these raw data are again used by the filters in the bank, and the new faulty satellite is invalidated.

6. The process according to claim 4, wherein in the event of a declaration of failure of a satellite, a partial reinitialization of the filters of the bank is performed using the satellite declared to be faulty by reinitializing the states connected with the measurements received from the satellite positioning system and the states connected with the other sensors used, and by desensitizing the states affected by the breakdown by adding state noise.

7. The process according to claim 5, wherein the main Kalman filter and the secondary Kalman filters further use measurement issued from other sensors, wherein in the event of a declaration of a failure of a satellite, a partial reinitialization of the filters of the bank is performed using the satellite declared to be faulty by reinitializing states connected with the measurements received from the satellite positioning system, and sates connected with the other sensors and by desensitizing the states affected by the breakdown by adding state noise.

8. The process according to claim 1 also implementing, for each filter in the bank, a statistical test of the a priori innovation of each of the satellites used by the filter.

9. The process according to claim 8 wherein, in the case where several satellites are declared to be faulty as a result of the statistical test of their cross-innovation, the method further comprises:
determining the Kalman filter using the greater number of satellites having a prior innovations below a threshold, invalidating the satellite not used by the previously determined Kalman filter,
so that the raw measurement of said invalidated satellite is no longer used by the filters in the bank.

10. The process according to claim 9, wherein, in the case where several satellites are declared to be faulty as a result of the statistical test of their cross-innovation and where several secondary Kalman filters are using the same greatest number of satellites having a priori innovation below a threshold, the satellite having the greatest absolute value of the ratio of the cross-innovation to its covariance is invalidated so that the raw measurement of said invalid satellite is no longer used by the filters in the bank.

11. A data fusion device (1) comprising a bank (3) of Kalman filters including:
a main Kalman filter generating a principal hybrid navigation solution based on intertial measurements calculated by a virtual platform (2) and raw measurements of signals emitted by all the satellites of a satellite positioning system (GNSS),
for each satellite, a secondary Kalman filter generating a secondary hybrid navigation solution based on inertial measurements calculated by a virtual platform (2) and raw measurements of signals emitted by all the satellites of the satellite positioning system except for said satellite,
and a satellite failure detection and rejection module configured so as to implement a process consisting in, for each satellite in the constellation:
calculating a cross-innovation of the satellite representative of the distance between:
an observation corresponding to a raw measurement issuing from said satellite, and
an a posteriori estimate of said observation generated by the secondary Kalman filter generating a secondary hybrid navigation solution based on inertial measurements calculated by a virtual platform (2) and raw measurements of signals emitted by all the satellites of the satellite positioning system except for said satellite,
performing a statistical test comparing the cross-innovation of said satellite to a threshold, and declaring a satellite to be faulty when its cross-innovation exceeds a threshold.

* * * * *